(12) United States Patent
Tyagi et al.

(10) Patent No.: US 10,237,265 B2
(45) Date of Patent: Mar. 19, 2019

(54) PROVIDING AUTHORIZATION DATA OVER A VALIDATED CONNECTION TO ACCESS A PROVIDER SERVICE

(71) Applicant: Motorola Mobility LLC, Chicago, IL (US)

(72) Inventors: Vivek Tyagi, Plantation, FL (US); Sudhir Vissa, Bensenville, IL (US); Binesh Balasingh, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 274 days.

(21) Appl. No.: 15/138,251

(22) Filed: Apr. 26, 2016

(65) Prior Publication Data
US 2017/0310661 A1 Oct. 26, 2017

(51) Int. Cl.
H04L 29/06 (2006.01)
H04W 12/06 (2009.01)
H04W 12/08 (2009.01)

(52) U.S. Cl.
CPC ........ H04L 63/0823 (2013.01); H04L 63/083 (2013.01); H04L 63/107 (2013.01); H04W 12/06 (2013.01); H04W 12/08 (2013.01)

(58) Field of Classification Search
None
See application file for complete search history.

(56) References Cited

U.S. PATENT DOCUMENTS

| | | | | |
|---|---|---|---|---|
| 7,039,713 B1* | 5/2006 | Van Gunter | ............ | H04L 63/08 709/225 |
| 2003/0204726 A1* | 10/2003 | Kefford | .................. | G06F 21/42 713/171 |
| 2006/0005033 A1* | 1/2006 | Wood | ..................... | H04L 9/326 713/182 |
| 2012/0304272 A1* | 11/2012 | Hawrylyshen | ......... | H04L 63/08 726/8 |
| 2015/0359022 A1* | 12/2015 | Lau | ..................... | H04W 76/023 455/41.2 |
| 2017/0048704 A1* | 2/2017 | McCann | ............... | H04W 12/06 |
| 2017/0048786 A1* | 2/2017 | Belleschi | ............... | H04L 67/16 |

* cited by examiner

Primary Examiner — Henry Tsang
(74) Attorney, Agent, or Firm — Yudell Isidore PLLC

(57) ABSTRACT

A method, system, and computer program product for automatically receiving authorization data required to log into a service portal from a second device to a first device, via a validated connection. The method includes the first device submitting a first request to a provider to acquire authorization data required for an authenticated login to an associated online service of the provider. In response to the first device submitting the first request to the provider, the first device automatically receives the authorization data via a validated connection with the second device. In response to receiving the authorization data via the validated connection, the first device transmits a second request, including the authorization data, to the provider to gain access to the online service.

21 Claims, 6 Drawing Sheets

PROVIDING AUTHORIZATION DATA OVER A VALIDATED CONNECTION TO ACCESS A PROVIDER SERVICE

BACKGROUND

1. Technical Field

The present disclosure generally relates to electronic devices and in particular to an improved method for automatically providing authorization data via a validated connection.

2. Description of the Related Art

Secondary authentication of a client device and/or a client is sometimes triggered by provider services, such as online banking, being accessed by a client. This secondary authentication can include the provider sending an authorization code, such as an alphanumeric code, for use during the login process. When a client using a first device attempts to log into a service portal associated with the provider service, the provider may send an authorization code that is required to complete the client's login to the service portal. The authorization code can be sent to a second device or communication service associated with the client. In response to the second device receiving the authorization code, the client must first read the code on the second device before manually entering the code on the first device to complete the login to the service portal. The manual entry of the authorization code introduces the possibility of user error since the client may misread the authorization code at the second device and/or mistype the authorization code at the first device. Additionally, if the client is not near the second device, the client is unable to access the authorization code and thus is unable to complete the login to the service portal.

BRIEF DESCRIPTION OF THE DRAWINGS

The description of the illustrative embodiments is to be read in conjunction with the accompanying drawings, wherein.

DETAILED DESCRIPTION

Figure 1:
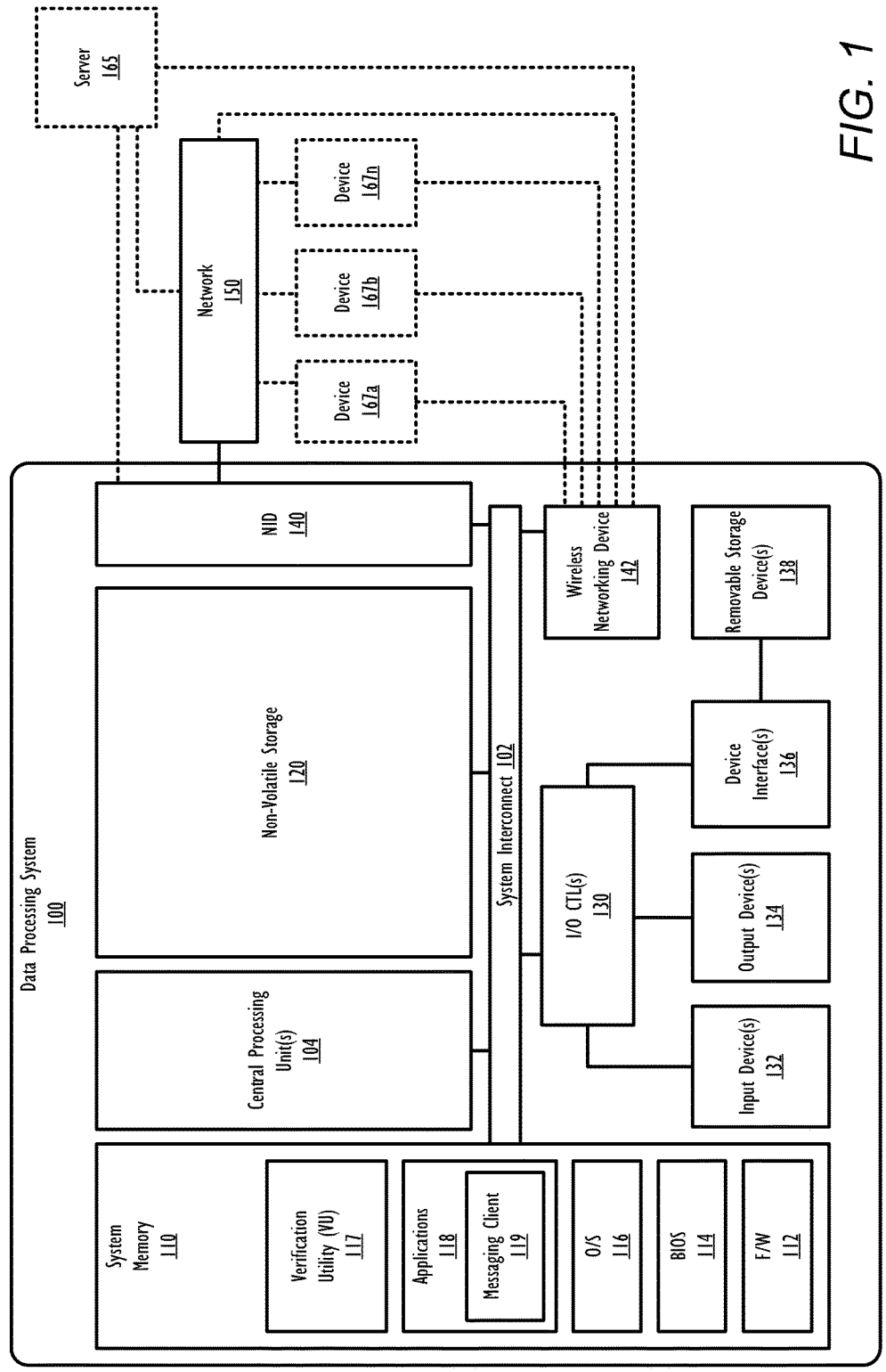
FIG. 1 provides a block diagram representation of an example data processing system within which certain aspects of the disclosure can be practiced, in accordance with one or more embodiments.

The illustrative embodiments provide a method, a system, and a computer program product for automatically receiving authorization data required to log into a service portal from a second device to a first device, via a validated connection. The method includes the first device submitting a first request to a provider to acquire authorization data required for an authenticated login to an associated online service of the provider. In response to the first device submitting the first request to the provider, the first device automatically receives the authorization data via a validated connection with a second device. In response to receiving the authorization data via the validated connection, the first device transmits a second request, including the authorization data, to the provider to gain access to the online service.

One or more embodiments of the method enable the second device to receive the authorization data from the provider via a messaging service. In response to determining that a connection between the first device and the second device is a validated connection, the second device transmits the authorization data to the second device via the validated connection.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within data processing system 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

With reference now to the figures, and beginning with FIG. 1, there is depicted a block diagram representation of an example data processing system (DPS) 100, within which one or more of the described features of the various embodiments of the disclosure can be implemented. In one embodiment, DPS 100 can be any electronic device such as a desktop computer, notebook computer, mobile phone, smart watch, camera, video recorder, or tablet.

DPS 100 includes at least one central processing unit (CPU) or processor 104 coupled to system memory 110 and non-volatile storage 120 via system interconnect 102. System interconnect 102 can be interchangeably referred to as a system bus, in one or more embodiments. One or more software and/or firmware modules can be loaded into system memory 110 during operation of DPS 100. Specifically, in one embodiment, system memory 110 can include therein a plurality of such modules, including one or more of firmware (F/W) 112, basic input/output system (BIOS) 114, operating system (OS) 116, verification utility (VU) 117, and application(s) 118. These software and/or firmware modules have varying functionality when their corresponding program code is executed by CPU 104 or by secondary processing devices within DPS 100. Application(s) 118 may further include messaging client 119, which is configured to send and/or receive messages from other devices, including but not limited to, devices 167a-n and server 165, and any other devices connected to network 150. In one embodiment, messages sent or received using messaging client 119 may include any of text, audio, video, images, and/or attachments including, but not limited to, encrypted and/or non-encrypted data.

VU 117 is a utility that executes within DPS 100 to perform the various methods and functions described herein. In one embodiment, VU 117 may validate a connection between a first device and a second device. In one or more embodiments, VU 117 may automatically receive authorization data from the second device at the first device via the validated connection and automatically transmit a second request including the authorization data to a provider to access an online service. In another embodiment, VU 117 may automatically receive authorization data at a first device from a provider via a messaging service and in response to determining that a connection between the first device and a second device is a validated connection, automatically transmit the authorization data to the second device, via the validated connection. For simplicity, VU 117 is illustrated and described as a stand-alone or separate software/firmware/logic component, which provides the specific functions and methods described below. However, in at least one embodiment, VU 117 may be a component of, may be combined with, or may be incorporated within firmware of DPS 100, or within the OS 116, and/or one or more of applications 118. In another embodiment, VU 117 may be a browser plugin module that integrates within an internet browser of application(s) 118.

DPS 100 further includes one or more input/output (I/O) controllers 130, which support connection by and processing of signals from one or more connected input device(s) 132, such as a keyboard, mouse, hardware button(s), touch screen, infrared (IR) sensor, fingerprint scanner, or microphone. I/O controllers 130 also support connection with and forwarding of output signals to one or more connected output devices 134, such as monitors/displays and audio speaker(s). Additionally, in one or more embodiments, one or more device interfaces 136, such as an optical reader, a universal serial bus (USB), a card reader, Personal Computer Memory Card International Association (PCMIA) slot, and/or a high-definition multimedia interface (HDMI), can be associated with DPS 100. Device interface(s) 136 can be utilized to enable data to be read from or stored to corresponding removable storage device(s) 138, such as a compact disk (CD), digital video disk (DVD), flash drive, or flash memory card. In one or more embodiments, device interfaces 136 can further include General Purpose I/O interfaces, such as I²C, System Management Bus (SMBus), and peripheral component interconnect (PCI) buses.

DPS 100 further includes a network interface device (NID) 140 and wireless networking device (WND) 142 that enables DPS 100 and/or components within DPS 100 to communicate and/or interface with other devices, services, and components that are located external to DPS 100. In one embodiment, DPS 100 may directly connect to one or more of these external devices, such as server 165 and devices 167a-n, via NID 140. In one or more embodiments, WND 142 may be used to directly connect, via a wireless connection, to one or more of these external devices independently from, or in combination with, NID 140. These devices, services, and components can also interface with DPS 100 via an external network, such as example network 150, using one or more communication protocols. Network 150 can be a local area network, wide area network, personal area network, and the like, and the connection to and/or between network and DPS 100 can be wired or wireless or a combination thereof. For purposes of discussion, network 150 is indicated as a single collective component for simplicity. However, it is appreciated that network 150 can comprise one or more direct connections to other devices as well as a more complex set of interconnections as can exist within a wide area network, such as the Internet.

Figure 2:
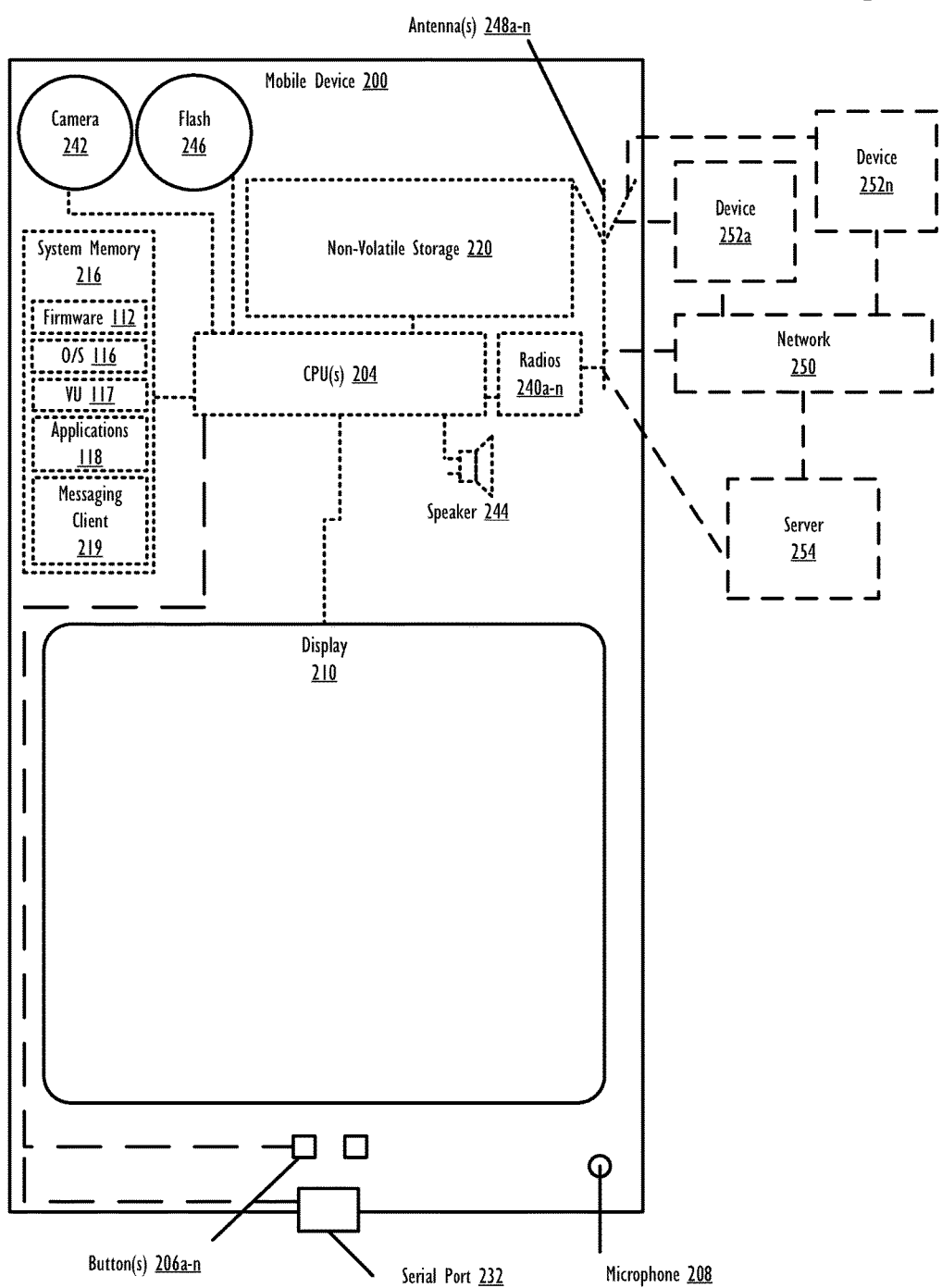
FIG. 2 illustrates a mobile device within which certain aspects of the disclosure can be practiced, in accordance with one or more embodiments.

FIG. 2 illustrates an example mobile device 200 within which one or more of the described features of the various embodiments of the disclosure can be implemented. Mobile device 200 includes at least one central processing unit (CPU) or processor 204. CPU 204 is coupled to system memory 216 and/or non-volatile storage 220, within which firmware 112, VU 117, and messaging client 219 can be stored for execution on CPU 204. According to one aspect, VU 117 executes within mobile device 200 to perform the various methods and functions described herein. For simplicity, VU 117 is illustrated and described as a stand-alone or separate software/firmware/logic component, which provides the specific functions and methods described below. Messaging client 219 is configured to send and/or receive messages from other devices, including but not limited to, devices 252a-n and server 254, and any other devices connected to network 250. In one embodiment, messages sent or received using messaging client 219 may include any of text, audio, video, images, and/or attachments including, but not limited to, encrypted and/or non-encrypted data.

As shown, mobile device 200 comprises several input devices and output devices for enabling a user to interface with mobile device 200. In the illustrated embodiment, mobile device 200 includes a camera sensor 242, camera flash 246, hardware buttons 206a-"n", microphone 208, and speaker 244. In one embodiment, at least one of camera sensor 242 and microphone 208 may be used independently or in conjunction with each other to capture audio, image, and/or video media. Microphone 208 may be used to receive spoken input/commands from a user. Speaker 244 is used to output audio. Hardware buttons 206a-n are selectable buttons which are used to receive manual/tactile input from a user to control specific operations of mobile device 200 and/or of applications executing thereon. In one embodiment, hardware buttons 206a-n may also include, or be connected to, one or more sensors (e.g. a fingerprint scanner) and/or be pressure sensitive. Hardware buttons 206a-n may also be directly associated with one or more functions of the GUI and/or functions of an OS, application, or hardware of mobile device 200. In one embodiment, hardware buttons 206a-n may include a keyboard.

Mobile device 200 also includes serial port 232 (e.g., a USB (universal serial bus) port) which can be one of an input port, an output port, and an input/output port. Serial port 232 allows a direct physical connection to and communication of data with a second device. In one embodiment, serial port 232 may also connect to a power charger (not pictured) for charging a battery (not pictured) of mobile device 200.

Mobile device 200 also includes display 210, which is capable of displaying text, media content, and/or a graphical user interface (GUI) of firmware and/or one or more applications executing on mobile device 200. In one embodiment, display 210 is a touch screen that is also capable of receiving touch input from a user of mobile device 200 interfacing with a displayed GUI. The GUI can be rendered by CPU 204 for viewing on display 210. In one embodiment, the GUI may include a virtual keyboard for receiving touch input in combination with display 210.

Mobile device 200 also includes one or more wireless radios 240a-n and one or more antenna(s) 248a-n that enable mobile device 200 to wirelessly connect to, and transmit and receive voice communication and/or data with, one or more other devices, such as devices 252a-n and server 254. As a wireless device, mobile device 200 can transmit the data over a wireless network 250 (e.g., a Wi-Fi network, cellular network, Bluetooth network (including Bluetooth low energy (BLE) networks), a wireless ad hoc network (WANET), or personal area network). In one embodiment, mobile device 200 may be further equipped with an infrared (IR) device (not pictured) for communicating with other devices using an IR connection. In another embodiment, mobile device 200 may communicate with one or more other device using a wired or wireless USB connection.

Figure 3:
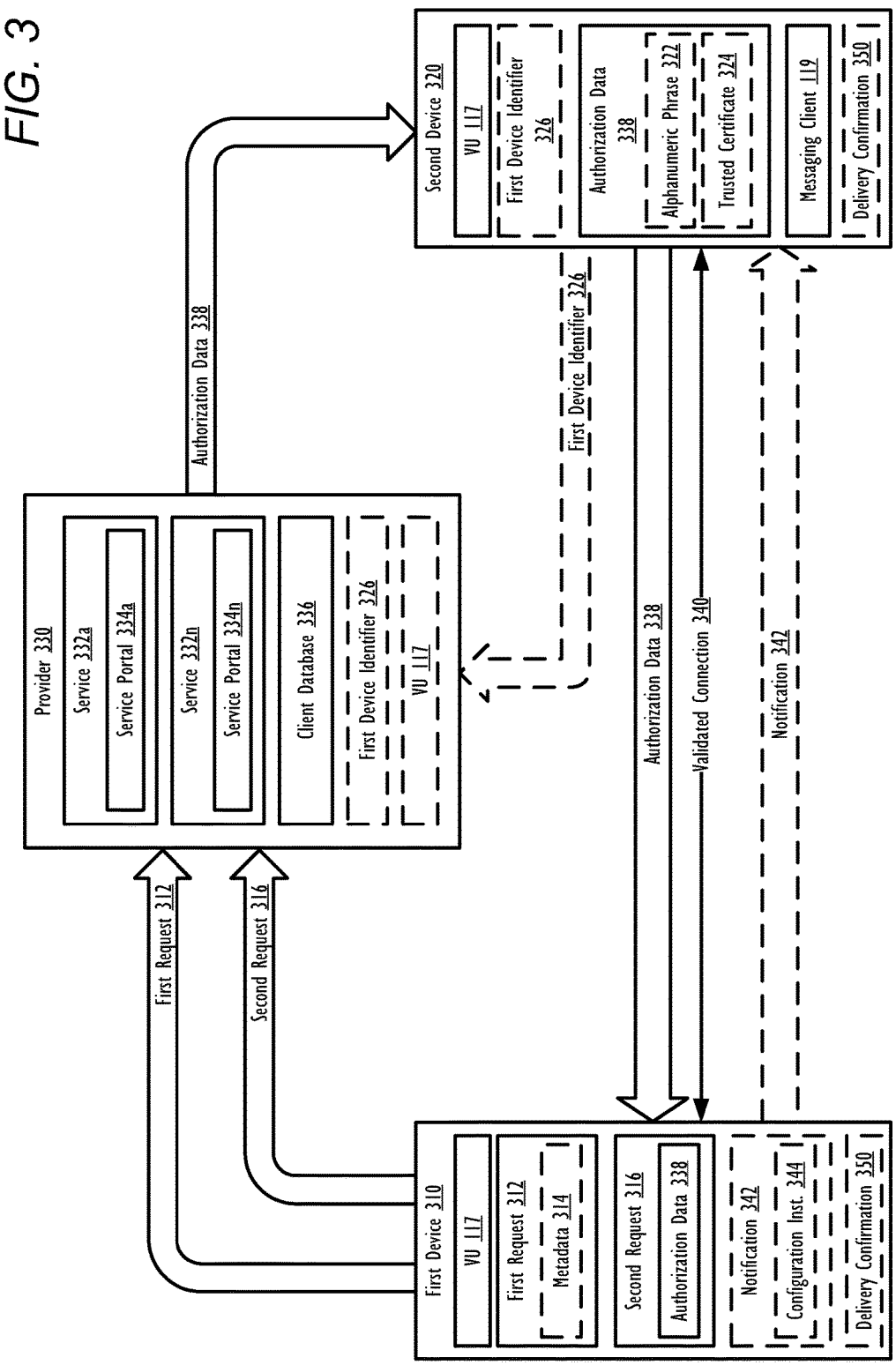
FIG. 3 illustrates an example first device configured for accessing an online service of a provider using authorization data, in accordance with one or more embodiments.

FIG. 3 is a block diagram illustrating the directional flow of processes and data during authenticated access by a first device to an online service of a provider using authorization data that is automatically received from a second device, in accordance with one or more embodiments. It should be noted that first device 310 and second device 320 may be configured as DPS 100, mobile device 200, or any device that is executing VU 117. In one embodiment, provider 330 is a computer system executing specific code that enables provider 330 to function as a server (e.g. server 165) that provides access by (a login account presented on) first device 310 to services 332a-n in response to a successful login to a respective service portal 334a-n. In another embodiment, provider 330 may also provide access to services 332a-n to at least one other device, such as second device 320 and/or one or more devices (not pictured).

In FIG. 3, first device 310 submits a first request 312 to provider 330 to access at least one service 332a-n. In one embodiment, first request 312 may contain user-supplied login information (e.g., username and password) that is associated with a client that is requesting access to the at least one service 332a-n via first device 310. In another embodiment, first request 312 may contain identifying information associated with first device 310.

In response to receiving first request 312, provider 330 analyzes the request to identify at least one requested service 332a-n. Provider 330 then searches client database 336 to identify at least one client profile and/or device profile that first request 312 is associated with. It should be noted that while client database 336 is illustrated within provider 330, in another embodiment, client database 336 may be stored within any local or remote storage that is accessible by provider 330. Based on the identified client profile and/or device profile, provider 330 identifies second device 320 where authorization data 338 is to be delivered, and provider 330 generates and transmits authorization data 338 to second device 320. In another embodiment, first request 312 may also identify second device 320 (i.e., first request 312 includes an identifier of second device 320). In one embodiment, second device 320 is registered to and/or associated with first device 310 and/or a same client that submitted first request 312. In one or more embodiments, second device 320 may be pre-paired to first device 310 via any secure connection. In another one or more embodiments, a trust relationship may be pre-established between first device 310 and second device 320 at a time prior to first device 310 submitting first request 312 to provider 330. In yet another embodiment, in response to transmitting first request 312 to provider 330, first device 310 may also transmit delivery confirmation 350 to provider 330, that when returned by provider 330 to first device 310, verifies that provider 330 received first request 312. If delivery confirmation message 350 is not returned to first device 310 from provider 330 within a predetermined amount of time, an error is presented at first device 310. In an alternate embodiment, provider 330 may initiate a handshake with first device 310. During the handshake, provider 330 receives a message from first device 310 that confirms first device 310 as the sender of first request 312. In one or more embodiments, during the handshake, provider 330 may also receive an identification of second device 320 as the target recipient of authorization data 338.

In another embodiment, second device 320 is a trusted device identified in the at least one client profile and/or device profile. In this embodiment, second device 320 can be associated with another client other than the client associated with first device 310. The other client may be identified with a client profile of client database 336 as being trusted by the client associated with first device 310. For example, client database 336 may identify the other client as being a trusted friend or coworker of the client associated with first device 310. In still another embodiment, in response to determining that second device 320 is unavailable or has not received authorization data 338, provider 330 may select a new device as second device 320 for receiving authorization data 338, based on the at least one client profile and/or device profile.

Authorization data 338 contains data required for first device 310 to complete an authenticated login to provider 330 to access service(s) 332a-n. In one embodiment, authorization data 338 includes an alphanumeric phrase 322 (e.g., LZX24YQ). In another embodiment, authorization data 338 includes trusted certificate 324, which facilitates a secure login to access service(s) 332a-n, and/or encrypted or non-encrypted security token (not pictured). Authorization data 338 may also optionally include other data, including information that identifies at least one of: provider 330, first device 310, second device 320, service 332, and service portal(s) 334a-n. In one embodiment, authorization data 338 is contained within a message such as an electronic mail message, short message service (SMS) message, or instant message. In this embodiment, second device 320 may parse a received message to retrieve a subset portion that corresponds to authorization data 338 such that only authorization data 338 is transmitted to first device 310.

In response to second device 320 receiving authorization data 338 from provider 330, VU 117 performs/institutes a validation check of at least one connection, between first device 310 and second device 320. It should be noted that VU 117 may perform the validation check at either first device 310 or second device 320. In an alternate embodiment, the validation check may be performed by another device having VU 117 executing thereon, such as provider 330 and/or a central service authority (not pictured) that is connected to both first device 310 and second device 320. In one embodiment, the validation check may be dynamically performed in real time in response to data (e.g., authorization data 338, delivery confirmation 350) existing for exchange between first device 310 and second device 320. In one embodiment, the connection may be any direct connection that facilitates the exchange of data, including, but not limited to, a wired or wireless USB connection, infrared (IR) connection, Bluetooth network (including Bluetooth low energy (BLE) networks), personal area network (PAN), or a wireless ad hoc network (WANET). In another embodiment, the connection may be an indirect connection that enables the exchange of data using a shared network such as a wire-line or wireless local area network, cellular network, or the Internet.

When multiple connections are available between first device 310 and second device 320, VU 117 may compare the available connections and prioritize a particular connection of the available connections for validation. The selection of one connection from among multiple available connections can be based on inherent advantages of that connection, such as security, transmission speed, and fewest hops between first device 310 and second device 320. In one or more embodiments, a connection from among the multiple available connections may be selected based on that connection being an "out of band" connection. An "out of band" connection is a connection which utilizes a separate authentication mechanism to interconnect first device 310 and second device 320 from an authentication mechanism utilized in a connection that was used to (i) transmit first request 312 to provider 330 and/or (ii) to receive authorization data 338 from provider 330 at second device 320. For example, if first request 312 was sent from first device 310 to provider 330 over an Internet connection, VU 117 may prioritize a Bluetooth and/or WANET connection (which are "out of band" connections) between first device 310 and second device 320 for validation over other connections that utilize the Internet (which is an "in band" connection with the connection used to transmit first request 312). In one embodiment, VU 117 may select an "in band" connection for validation when no "out of band" connections are available.

In one embodiment, in response to receiving authorization data 338, second device 320 may initiate a handshake with provider 330. During the handshake, second device 320 may receive a message that verifies provider 330 as a sender of authorization data 338. In one or more embodiments, during the handshake, second device 320 may transmit a message to provider 330 that verifies the identity of second device 320 to provider 330. In an alternate embodiment, provider 330 may (optionally) issue delivery confirmation 350 to second device 320, that when returned by second device 320 to provider 330 verifies that second device 320 received authorization data 338. If delivery confirmation message 350 is not returned to provider 330 from second device 320 within a predetermined amount of time, provider 330 may invalidate authorization data 338. In one or more embodiments, the available connections are inactive connections and/or previously saved connections that may be reestablished. In some embodiments, the available connections are connections that are not currently being utilized by first device 310 and second device 320.

In one or more embodiments, VU 117 may validate a connection between first device 310 and second device 320 as validated connection 340 in response to determining validated connection 340 is a trusted connection that satisfies a pre-established security parameter. In one embodiment, the pre-established security parameter may identify a particular type of connection and/or a particular level of security required for an authenticated connection between first device 310 and second device 320. For example, the pre-established security parameter may require a Hypertext Transfer Protocol Secure (HTTPS) connection or Point-to-Point Tunneling Protocol (PPTP) connection between first device 310 and second device 320. In another embodiment, the pre-established security parameter may specify a same trusted entity that first device 310 and second device 320 must both be connected to. The same trusted entity may include at least one of: a same network and a same server.

In response to determining the connection is a trusted connection that satisfies a pre-established security parameter, VU 117 validates the connection as validated connection 340 that is authorized for transmitting authorization data 338.

In one or more embodiments, VU 117 may validate a connection between first device 310 and second device 320 as validated connection 340 in response to determining first device 310 and second device 320 are located in a same location. In one embodiment, the same location includes a same proximate area, including, but not limited to, a geographic region. In one embodiment, a geographic region includes at least one of: a defined radius from at least one particular location or a defined geographic area, such as within established boundaries of a particular company building, a particular city, or a particular country. In another embodiment, VU 117 executing on either provider 330, first device 310, and/or second device 320 may continually monitor a distance between a current location of first device 310 and a current location of second device 320. The geographic location of first device 310, and second device 320 may be continually monitored by VU 117 based on, for example, global positioning satellite (GPS) data for first device 310 and second device 320. In another embodiment, VU 117 may identify and track a current location of first device 310 and second device 320 based on a current wired or wireless network connection to first device 310 and second device 320. VU 117 may further automatically invalidate validated connection 340 if the distance between first device 310 and second device 320 exceeds a pre-defined threshold value.

The same location may also include one or more relative locations such as a connection to a same network or a same server. For example, VU 117 may validate a connection as validated connection 340 in response to both first device 310 and second device 320 being connected to a same enterprise network (which may include multiple separate physical locations), access point, or wireless hotspot. In another example, VU 117 may validate a connection as being authorized for transmitting authorization data 338 in response, to both first device 310 and second device 320 being connected to a same enterprise server.

In one or more embodiments, a connection may be validated in response to determining that either (i) the connection is a trusted connection that satisfies a pre-established security parameter or (ii) the first device and the second device are located in the same location. In an alternate embodiment, a connection may only be validated in response to determining that both (i) the connection is a trusted connection that satisfies a pre-established security parameter and (ii) the first device and the second device are located in the same location.

It should also be noted that, in one or more embodiments, two or more of the above methods for validating a connection may be combined such that two or more conditions are required in order to validate a connection. For example, to validate a connection first device 310 and second device 320 a particular connection between first device 310 and second device 320 must satisfy a pre-established security parameter and first device 310 and second device 320 must be located within in a same relative location and/or a same proximate area.

In response to identifying validated connection 340, second device 320 transmits authorization data 338 to first device 310 via validated connection 340. In one embodiment, prior to sending authorization data 338 to first device 310 via validated connection 340, second device 320 may filter out extraneous data within authorization data 338 that is not needed to complete an authenticated login to provider 330 to access service(s) 332a-n. For example, second device 320 may filter explanatory text, date/time information, and/or general identification information of provider 330 and/or second device 320 from authorization data 338 prior to transmitting authorization data 338 to first device 310 via validated connection 340. In another embodiment, prior to sending authorization data 338 to first device 310 via validated connection 340, second device 320 may insert information into authorization data 338 that provides additional instructions to facilitate/enable first device 100 to complete an authenticated login to provider 330 to access service(s) 332a-n. For example, second device 320 may insert instructions within authorization data 338 that identify a particular field within service portal 334a-n in which an authorization code within authorization data 338 must be inserted to complete an authenticated login. In one embodiment, in response to transmitting authorization data 338 to first device 310, second device 320 may (optionally) issue delivery confirmation 350 to first device 310, that when returned by first device 310 to second device 320, verifies that first device 310 received authorization data 338. If delivery confirmation 350 is not returned by first device 310 to second device 320 within a predetermined amount of time, second device 320 may autonomously transmit a message to provider 330 that invalidates authorization data 338.

In one embodiment, first device 310 may (optionally) automatically initiate a handshake with second device 320. During the handshake, first device 310 may transmit a message to device 320 that verifies receipt of authorization data 338 to second device 320 and/or receive a message from second device 320 that verifies second device 320 as a sender of authorization data 338. In another embodiment, first device 310 may (optionally) initiate a handshake with second device 320 during the verification of validated connection 340 to identify second device 320 as a sender of authorization data 338. In one embodiment, the handshake is performed only using validated connection 340. In another embodiment, the handshake is performed via any available connection and/or a connection other than validated connection 340. In response to being unable to verify second device 320 as the sender, first device 310 may automatically invalidate the received authorization data 338 and/or terminate validated connection 340.

In response to receiving authorization data 338, first device 310 transmits second request 316, including authorization data 338, to provider 330 to access the requested service(s) of services 332a-n. In response to receiving second request 316 including authorization data 338, provider 330 completes the authenticated login of first device 310 and provides first device 310 with access to the requested service(s) of services 332a-n. In one embodiment, authorization data 338 is provided to provider 330 by first device 310 inserting authorization data 338 into a designated field within a service portal 334a-n that corresponds to a same service 332a identified in first request 312. In this embodiment, in response to receiving authorization data 338, first device 310 may automatically insert authorization data 338 into second request 316 and transmit send second request 316 with authorization data 338 to provider 330 in response to receiving authorization data 338. In another embodiment, first device 310 may first prompt a user to accept authorization data 338 and/or approve transmission of second request 316 to provider 330 before VU 117 may insert authorization data 338 into second request 316 and/or transmit second request 316 with authorization data 338 to provider 330.

In one embodiment, provider 330 may require both authorization data 338 and first device identifier 326 to complete an authenticated login of first device 310 and enable access via first device 310 to requested service(s) of services 332a-n. First device identifier 326 contains unique identifying information associated with first device 310. In one embodiment, first device identifier 326 may include an internet protocol (IP) address and/or media access control (MAC) address of first device 310, and/or identifying information of a client that issued first request 312 via first device 310. In one embodiment, second device 320 automatically transmits first device identifier 326 to provider 330 in response to receiving authorization data 338. With this embodiment, access to requested service(s) of services 332a-n is only provided by provider 330 to first device 310 in response to provider 330 having received both (1) authentication data 332 from first device 310 and (2) first device identifier 326 from second device 320. In still another embodiment, first device identifier 326 may further include an internet protocol (IP) address and/or media access control (MAC) address of second device 320, and/or identifying information of second device 320 and/or a client associated with second device 320. It is appreciated that the client associated with second device 320 may be a same client as the client associated with first device 310 or a different client. In yet another embodiment, first device identifier 326 may apply a hash function to first device identifier 326 prior to transmitting first device identifier 326 to provider 330. In this embodiment, in response to receiving a hashed copy of first device identifier 326, provider 330 may apply a decryption algorithm to the hashed copy to extract first device identifier 326.

In one embodiment, first device 310 may capture metadata 314 within at least one of first request 312 and a service portal 334 associated with a requested service(s) of services 332a-n. First device 310 may analyze captured metadata 330 to identify provider 330. In response to identifying provider 330, first device 310 may generate and deliver, to second device 320, notification 342, which identifies provider 330 and which contains configuration instructions 344. Configuration instructions 344 may be transmitted by first device 310 to second device 320 using validated connection 340. In another embodiment, configuration instructions 344 may be transmitted to second device 320 using any available connection or a connection other than validated connection 340. Configuration instructions 344 contain instructions that configure second device 320 to autonomously monitor incoming transmissions for at least one message that is associated with provider 330 and includes authorization data 338. In one embodiment, second device 320 may apply configuration instructions 344 to configure messaging client 119 and/or one or more applications (e.g. application(s) 118) of second device 320.

In one embodiment, in response at least one of: (1) authorization data 338 being invalidated, (2) first device 310 not receiving authorization data 338 within a pre-established amount of time, or (3) validated connection 340 being invalidated before authorization data 338 is delivered to first device 310, VU 117 may present an alternate verification mode on first device 310. The alternate verification mode may be submitted to provider 330 within second request 316 in lieu of authorization data 338 to complete the authenticated login to provider 330 to access service(s) 332a-n. For example, in response to validated connection 340 being invalidated before authorization data 338 is delivered to first device 310, provider 330 may deliver at least one security question to first device 310. In response to receiving at least one answer to the at least one security question, provider 330 completes the authenticated login of first device 310 to access service(s) 332a-n.

Figure 4:
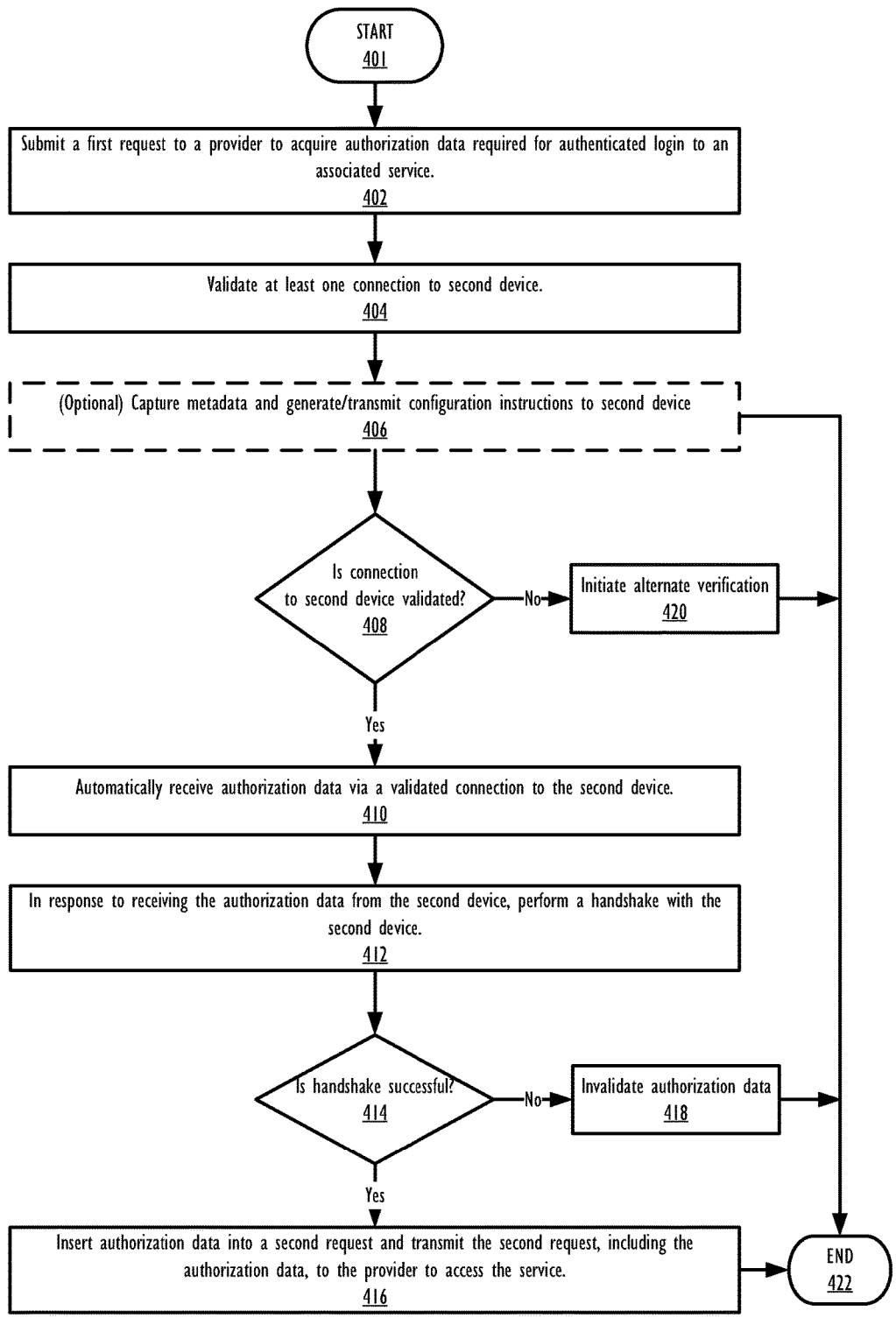
FIG. 4 is a flow chart illustrating a method for accessing an online service of a provider using authorization data, in accordance with one or more embodiments.

Referring now to FIG. 4, there is depicted a high-level flow-chart illustrating a method of accessing a service of a provider using authorization data that is automatically received from a second device, in accordance with one or more embodiments of the present disclosure. Aspects of the method are described with reference to the components of FIGS. 1-3. Several of the processes of the method provided in FIG. 4 can be implemented by a processor (e.g., CPU 104 or CPU 204) executing software code of VU 117 within a generic data processing system (e.g., FIG. 1) or a mobile device (e.g., FIG. 2). The method processes described in FIG. 4 are generally described as being performed by first processor (104) execution of VU 117 within DPS 100.

Method 400 commences at initiator block 401 then proceeds to block 402. At block 402, first device 310 submits first request 312 to provider 330. At block 404, VU 117 identifies connections between first device 310 and second device 320 and performs a validation check on at least one connection between first device 310 and second device 320. As described above, either first device 310 or second device 320 may initiate the validation check. Alternatively, the validation check may be performed by another device, such as provider 330 and/or a central service authority. At optional block 406, first device may capture and analyze metadata 314 within first request 312 and/or service portal 332a and generate and transmit, to second device 320, configuration instructions 344 to second device 320 to configure second device 320 to monitor incoming transmissions for at least one message that is associated with provider 330 and includes authorization data 338. At block 408, first device 310 determines whether at least one connection to second device 320 is validated. In response to determining no validated connections exist to second device 320, first device 310 transmits a message to provider 330 to initiate an alternate verification to complete the authenticated login (block 420). The method terminates at block 422.

In response to determining that validated connection 340 to second device 320 exists, the method proceeds to block 410 and first device 310 automatically receives authorization data 338 from second device 320. At block 412, first device 310 initiates a handshake with second device 320 to verify second device 320 as a sender of authorization data 338. It should be noted that in one or more embodiments, the handshake of block 412 may be omitted. In those embodiments, method 400 proceeds directly from block 410 to block 416. At block 414, first device 310 determines whether the handshake was successful, indicating that second device 320 was verified as the sender of authorization data 338. In response to determining the handshake was not successful, the authorization data is invalidated at block 418 and the method terminates at block 422. In response to determining the handshake was successful, method 400 proceeds to block 416. At block 416, first device 310 inserts authorization data 338 into a second request 316 and transmits second request 316 to provider 330 to access the requested service 332. Method 400 then terminates at block 422.

Figure 5:
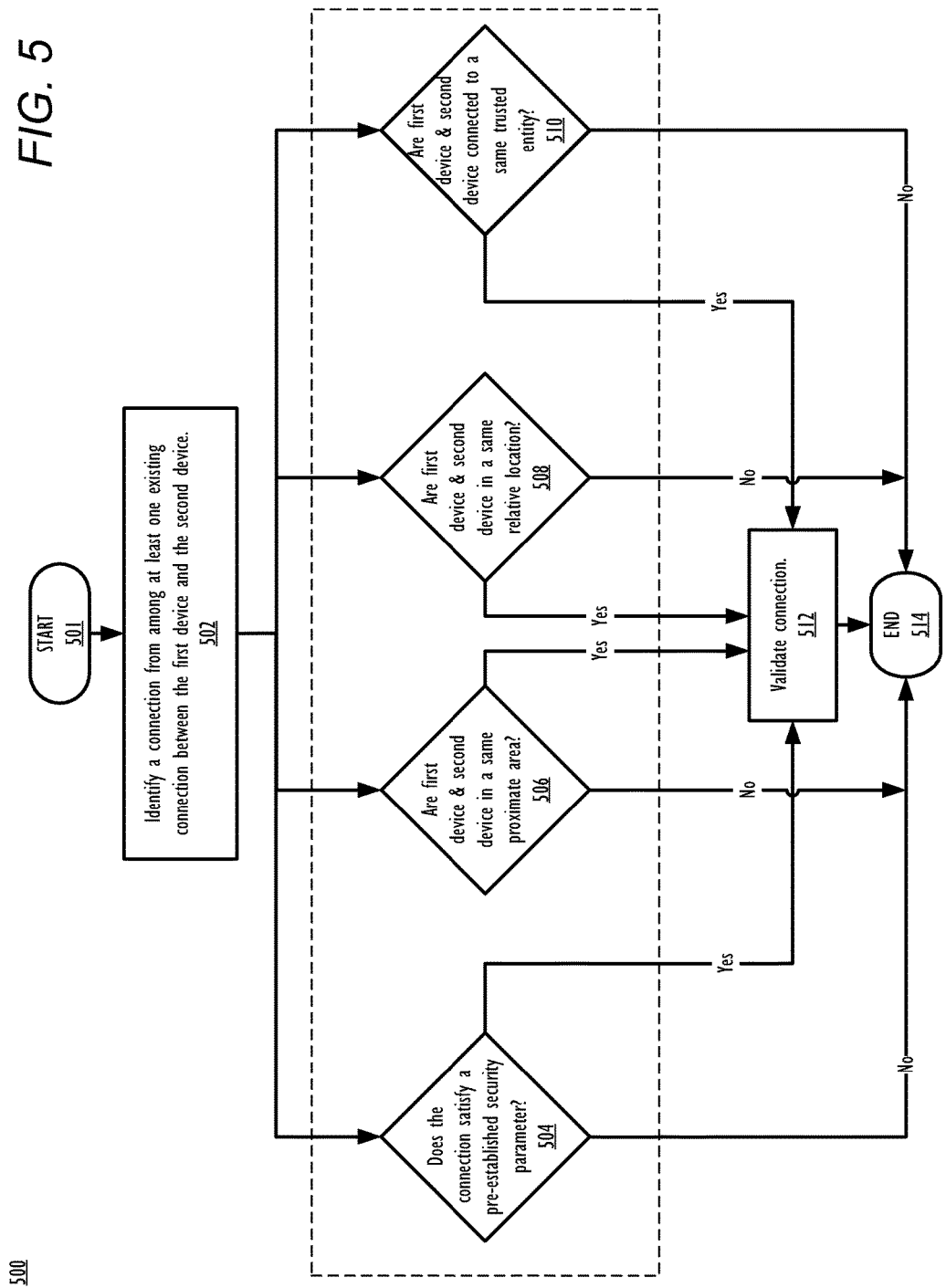
FIG. 5 is a flow chart illustrating a method for validating a connection between a first device and a second device, in accordance with one or more embodiments.

Referring now to FIG. 5, there is depicted a high-level flow-chart illustrating a method for validating a connection between a first device and a second device, in accordance with one or more embodiments of the present disclosure. It should be noted that portions of method 500 presented by FIG. 5 may be performed by any device executing VU 117 including, but not limited to, first device 310, second device 320, and provider 330. Method 500 commences at initiator block 501, then proceeds to block 502. At block 502, VU 117 identifies at least one connection between first device 310 and the second device 320. After block 502, method 500 continues to equivalent blocks 504-510. It should be noted, that in the exemplary embodiment provided by FIG. 5, VU 117 evaluates equivalent blocks 504-510 simultaneously to determine whether at least one of the conditions provided by equivalent blocks 504-510 is satisfied. In response to VU 117 determining an affirmative result to any one block of equivalent blocks 504-510, the method proceeds from that block to block 512.

At block 504, VU 117 determines whether the connection satisfies a pre-established security parameter. In response to determining the connection satisfies a pre-established security parameter, the connection is validated as being authorized for transmitting authorization data 338 (block 512) and the method terminates at block 514. In response to determining the connection does not satisfy a pre-established security parameter, method 500 terminates at block 514.

At block 506, VU 117 determines whether first device 310 and second device 320 are in a same proximate area. In response to determining first device 310 and second device 320 are in a same proximate area, the connection is validated as being authorized for transmitting authorization data 338 (block 512) and the method terminates at block 514. In response to determining first device 310 and second device 320 are not in a same proximate area, method 500 terminates at block 514.

At block 508, VU 117 determines whether first device 310 and second device 320 are in a same relative location. In response to determining first device 310 and second device 320 are in a same relative location, the connection is validated as being authorized for transmitting authorization data 338 (block 512) and the method terminates at block 514. In response to determining first device 310 and second device 320 are not in a same relative location, method 500 terminates at block 514.

At block 510, VU 117 determines whether first device 310 and second device 320 are connected to a same trusted entity. In response to determining first device 310 and second device 320 are connected to a same trusted entity, the connection is validated as being authorized for transmitting authorization data 338 (block 512) and the method terminates at block 514. In response to determining first device 310 and second device 320 are not connected to a same trusted entity, method 500 terminates at block 514.

Figure 6:
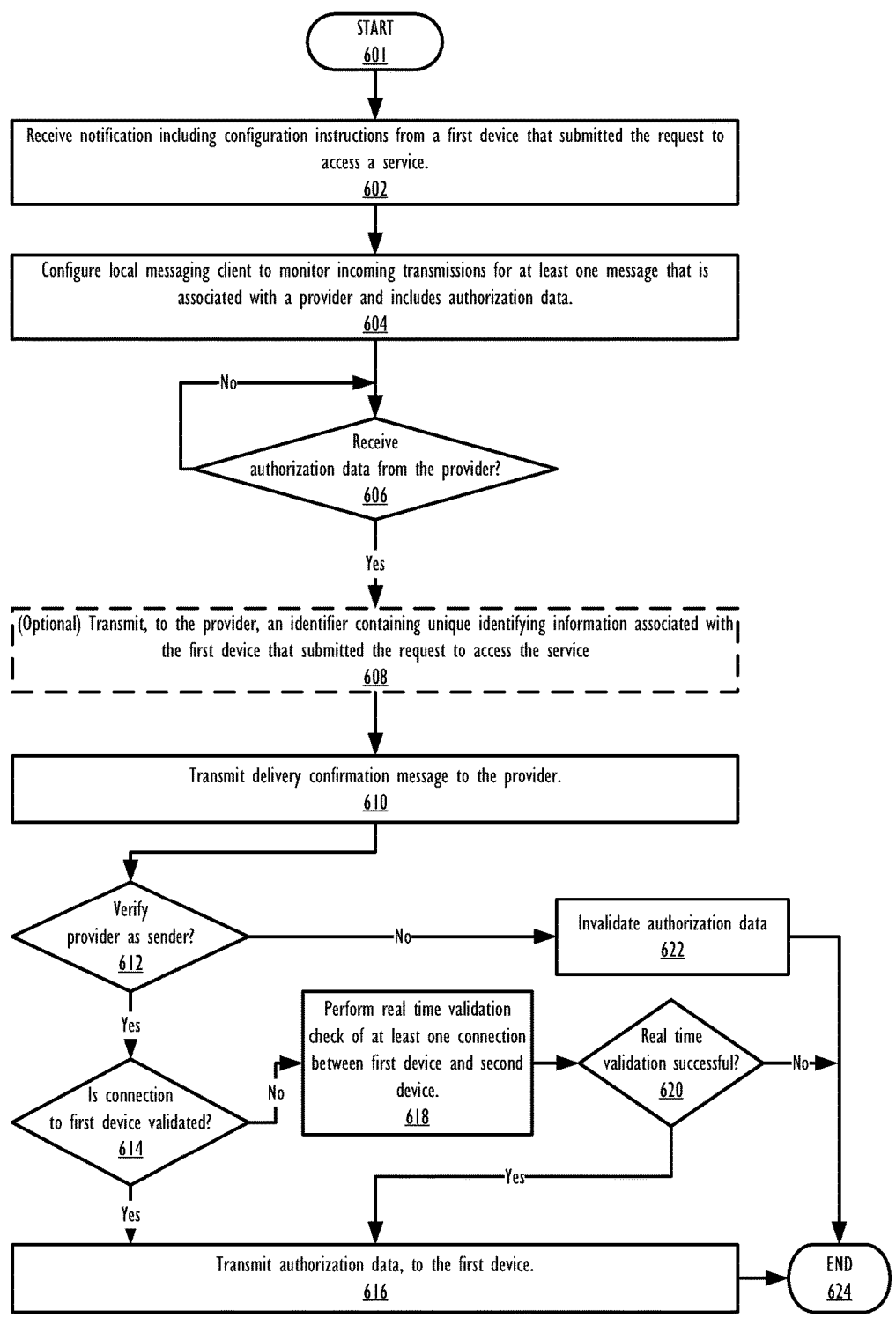
FIG. 6 is a flow chart illustrating a method for transmitting authorization data to a device that has submitted a request to access an online service at a provider, in accordance with one or more embodiments.

Referring now to FIG. 6, there is depicted a high-level flow-chart illustrating a method for transmitting authorization data from a second device to a first device that has submitted a request to access a service at a provider, in accordance with one or more embodiments of the present disclosure. Aspects of the method are described with reference to the components of FIGS. 1-3. Several of the processes of the method provided in FIG. 6 can be implemented by a processor (e.g., CPU 104 or CPU 204) executing software code of VU 117 within a generic data processing system (e.g., FIG. 1) or a mobile device (e.g., FIG. 2). The method processes described in FIG. 6 are generally described as being performed by first processor (104) execution of VU 117 within DPS 100.

Method 600 commences at initiator block 601. At block 602, second device 320 receives a notification (e.g., notification 342) that includes configuration instructions 344 from first device 310. At block 604, second device 320 configures messaging client 119 to monitor incoming transmissions for at least one message that is associated with provider 330 and includes authorization data 338. It should be noted that in one or more embodiments, second device 320 and/or messaging client 119 may be preconfigured to monitor incoming transmissions for at least one message that is associated with provider 330 and includes authorization data 338. In those embodiments method 600 proceeds directly from initiator block 601 to block 606. At block 606, second device 320 determines whether authorization data 338 has been received from provider 330. In response to receiving authorization data 338, method 600 continues to optional block 608 at which second device 320 transmits first device identifier 326 to provider 330. At block 610, second device 320 transmits a delivery confirmation message to provider 330. At block 612, second device 320 determines whether a reply has been received within a predetermined amount of time that verifies provider 330 as a sender of authorization data 338. In response to being unable to verify provider 330 as a sender of authorization data 338, the authorization data is invalidated (block 622) and the method terminates (block 624). In response to verifying provider 330 as the sender of authorization data 338, the method continues to block 614. It should be noted that in one or more embodiments, the transmission of delivery confirmation message to provider 330 may be omitted. In those embodiments, method 600 proceeds directly from block 610 to block 614.

At block 614, VU 117 determines whether there is a validated connection (validated connection 340) to first device 310. In response to determining there is a validated connection between the devices, the method continues to block 616 where second device 320 transmits authorization data 338 to first device 310 via validated connection 340. The method then terminates at block 624. However, in response to there not being a validated connection to first device 310, VU 117 of second device initiates a real time validation check of at least one connection between first device 310 and second device 320 (block 618). At block 620, a determination is made whether the real time validation check was successful and at least one connection between first device 310 and second device 320 is a validated connection. In response to determining there is a validated connection between the devices, the method proceeds to block 616. In response to there not being a validated connection to first device 310, the method terminates at block 624.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device (e.g., removable storage device(s) 138), or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
   a first device submitting, via a network-connected network interface device (ND) of the first device, a first request to a network-connected provider to acquire authorization data required for authenticated login to access an associated service;
   capturing metadata within at least one of the first request and a service portal associated with the service;
   analyzing the metadata to identify the network-connected provider; and
   in response to identifying the network-connected provider, transmitting, via a wireless networking device of the first device that establishes a validated connection with a second device, a notification to the second device that identifies the provider and which contains configuration instructions that configure the second device to monitor incoming transmissions for at least one message that is associated with the provider and includes the authorization data;
   receiving the authorization data via the validated connection with the second device, the authorization data being communicated to the second device from the provider in response to the provider receiving the first request; and
   in response to receiving the authorization data, a processor of the first device transmitting, to the network-connected provider via the network-connected NID, a second request to access the service, the second request including the authorization data required for access by the first device to the service, the second request transmitted to the provider only after receipt of the authorization data from the second device via the validated connection.

2. The method of claim 1, wherein:
   the authorization data includes at least one of an alphanumeric phrase and a trusted certificate; and
   transmitting the second request to the provider further comprises, automatically inserting the authorization data within the second request and automatically transmitting the second request with the inserted authorization data to the provider.

3. The method of claim 1, further comprising:
   identifying at least one existing connection between the first device and the second device; and
   validating a connection from among the at least one existing connection between the first device and the second device.

4. The method of claim 3, wherein validating the connection between the first device and the second device further comprises:
determining whether the connection is a trusted connection that satisfies at least one pre-established security parameter; and
in response to determining the connection is a trusted connection, validating the connection as being authorized for transmitting the authorization data.

5. The method of claim 3, wherein validating the connection between the first device and the second device further comprises:
determining whether the first device and the second device are located in a same location, wherein the same location includes at least one of: a same proximate area and a same relative location; and
in response to determining the first device and the second device are located in the same location, validating the connection as being authorized for transmitting the authorization data.

6. The method of claim 5, further comprising:
determining whether the first device and the second device are both connected to a same trusted entity, wherein the same trusted entity includes at least one of: a same network and a same server; and
in response to determining the first device and the second device are connected to a same trusted entity, identifying the first device and the second device as being in the same relative location.

7. The method of claim 1, further comprising:
in response to automatically receiving the authorization data via the validated connection to the second device, performing a handshake with the second device to confirm receipt of the authorization data and verify the second device as a sender of the authorization data; and
in response to being unable to verify the second device as the sender of the authorization data, invalidating the authorization data.

8. A first device comprising:
a memory;
a transceiver;
a network-connected network interface device (NID); and
a processor that is coupled to the memory, the NID, and the transceiver and which generates a plurality of processing modules comprising a verification module that configures the processor to perform at least two access verification measures to obtain access to a service, wherein:
the verification module configures the processor to:
submit, via a network-connected network interface device (NID) of the first device, a first request to a provider to acquire authorization data required for authenticated login to access an associated service;
capture metadata within at least one of the first request and a service portal associated with the service;
analyze the metadata to identify the provider; and
in response to identifying the provider, transmit, via the transceiver that establishes a validated connection with a second device, a notification to the second device that identifies the provider and which contains configuration instructions that configure the second device to monitor incoming transmissions for at least one message that is associated with the provider and includes the authorization data;
receive, via the transceiver, authorization data from the second device via the validated connection, the authorization data being communicated to the second device from the provider in response to the provider receiving the first request from the first device; and
in response to receiving the authorization data, transmit to the provider via the network-connected NID, a second request including the authorization data required for access by the first device to the service, the second request transmitted to the provider only after receipt of the authorization data from the second device via the validated connection.

9. The first device of claim 8, wherein:
the authorization data includes at least one of an alphanumeric phrase and a trusted certificate; and
in transmitting the second request to the provider, the verification module automatically inserts the authorization data within the second request and automatically transmits the second request with the inserted authorization data to the provider.

10. The first device of claim 8, wherein the verification module:
identifies at least one existing connection between the first device and the second device; and
validates a connection from among the at least one existing connection between the first device and the second device.

11. The first device of claim 10, wherein in validating the connection to the second device, the verification module:
determines whether the connection is a trusted connection that satisfies at least one pre-established security parameter; and
in response to determining the connection is a trusted connection, validates the connection as being authorized for transmitting the authorization data.

12. The first device of claim 10, wherein in validating the connection to the second device, the verification module:
determines whether the first device and the second device are located in a same location, wherein the same location includes at least one of: a same proximate area and a same relative location; and
in response to determining the first device and the second device are located in the same location, validates the connection as being authorized for transmitting the authorization data.

13. The first device of claim 12, wherein in determining whether the first device and the second device are located in a same location, the verification module:
determines whether the first device and the second device are both connected to a same trusted entity, wherein the same trusted entity includes at least one of: a same network and a same server; and
in response to determining the first device and the second device are connected to a same trusted entity, identifies the first device and the second device as being in the same relative location.

14. The first device of claim 8, wherein the verification module:
in response to automatically receiving the authorization data via the validated connection to the second device, performs a handshake with the second device to confirm receipt of the authorization data and to verify the second device as a sender of the authorization data; and
in response to being unable to verify the second device as the sender of the authorization data, invalidates the authorization data.

15. A computer program product comprising:
a computer readable storage device; and program code on the computer readable storage device that when executed within a processor associated with a device, the program code enables the device to provide the functionality of:

submitting, via a network-connected network interface device (NID) of the first device, a first request to a network-connected provider to acquire authorization data required for authenticated login to access an associated service;

capturing metadata within at least one of the first request and a service portal associated with the service;

analyzing the metadata to identify the network-connected provider; and in response to identifying the network-connected provider, transmitting, via a wireless networking device of the first device that establishes a validated connection with a second device, a notification to the second device that identifies the provider and which contains configuration instructions that configure the second device to monitor incoming transmissions for at least one message that is associated with the provider and includes the authorization data;

receiving the authorization data via the validated connection with the second device, the authorization data being communicated to the second device from the provider in response to the provider receiving the first request; and in response to receiving the authorization data, a processor of the first device transmitting, to the network-connected provider via the network-connected NID, a second request to access the service, the second request including the authorization data required for access by the first device to the service, the second request transmitted to the provider only after receipt of the authorization data from the second device via the validated connection.

16. A method comprising:

identifying at least one existing connection between a first device and a second device;

validating a connection from among the at least one existing connection between the first device and the second device by determining whether the connection is a trusted connection that satisfies at least one pre-established security parameter;

in response to determining the connection is a trusted connection, validating the connection as being authorized for transmitting an authorization data;

receiving, from the first device, via the trusted connection, a notification that identifies a provider and which contains configuration instructions that configure the second device to monitor incoming transmissions for at least one message that is associated with the provider and includes the authorization data;

receiving, at the second device, authorization data from the provider via a messaging service, wherein the authorization data is required for authenticated login of the first device to an associated service of the provider, and wherein the authorization data is transmitted to the second device in response to the provider receiving a request for authorization data from the first device; and in response to determining that the connection between the second device and the first device is a validated connection, transmitting the authorization data to the first device, via the validated connection.

17. The method of claim 16, further comprising:

receiving the notification from the first device that identifies the provider and which contains configuration instructions for a local messaging client of the second device; and configuring the local messaging client to monitor incoming transmissions for at least one message that is associated with the provider and includes the authorization data.

18. The method of claim 16, further comprising:

identifying at least one existing connection between the first device and the second device;

validating a connection from among the at least one existing connection between the first device and the second device by determining whether the first device and the second device are located in a same location, wherein the same location includes at least one of: a same proximate area and a same relative location; and in response to determining the first device and the second device are located in the same location, validating the connection as being authorized for transmitting the authorization data.

19. The method of claim 18, further comprising:

determining whether the first device and the second device are both connected to a same trusted entity, wherein the same trusted entity includes at least one of: a same network and a same server; and in response to determining the first device and the second device are connected to a same trusted entity, identifying the first device and the second device as being in the same relative location.

20. The method of claim 16, further comprising:

in response to receiving the authorization data from the provider, transmitting a delivery confirmation message to the provider;

receiving a reply to the delivery confirmation message that verifies the provider as a sender of the authorization data; and in response to being unable to verify the provider as the sender of the authorization data, invalidating the authorization data.

21. The method of claim 16, further comprising:

in response to receiving the authorization data from the provider, transmitting, to the provider, an identifier that contains unique identifying information associated with the first device, wherein the authorization data and the identifying information are required for authenticated login of the first device to the associated service.

* * * * *